W. W. S. KIME.
Seed-Dropper.
No. 206,336.  Patented July 23, 1878.
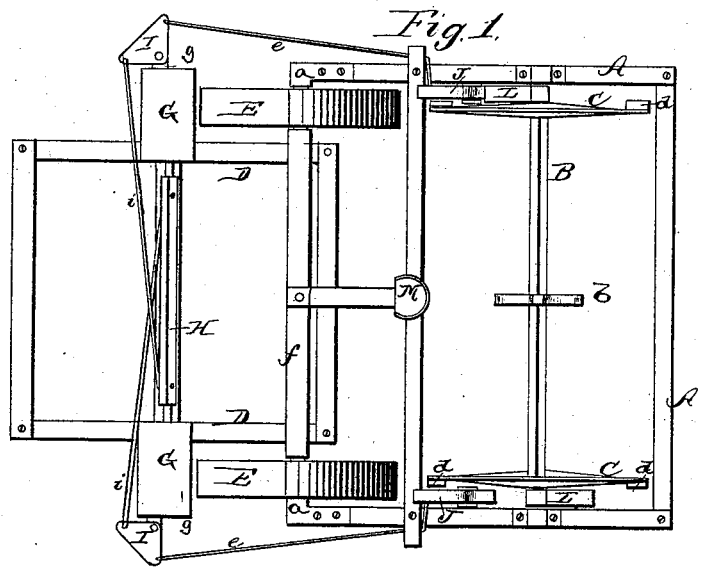
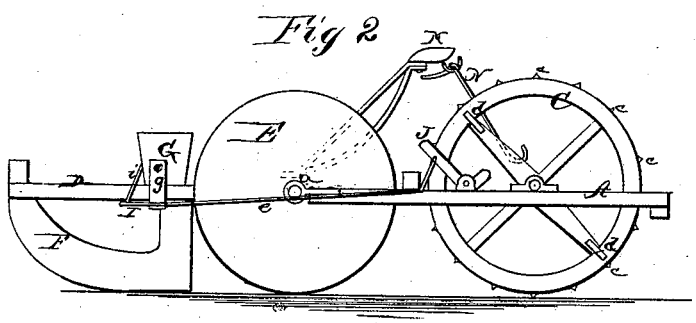

UNITED STATES PATENT OFFICE.

WARREN W. S. KIME, OF VICTOR, IOWA.

IMPROVEMENT IN SEED-DROPPERS.

Specification forming part of Letters Patent No. 206,336, dated July 23, 1878; application filed June 28, 1878.

*To all whom it may concern:*

Be it known that I, WARREN W. S. KIME, of Victor, in the county of Iowa and State of Iowa, have invented certain new and useful Improvements in Seed-Droppers; and I do hereby declare that the following is a full, clear, and exact description thereof, reference being had to the accompanying drawings, and to the letters of reference marked thereon, which form part of this specification.

The nature of my invention consists in the peculiar construction and arrangement of a seed-dropper and the method of operating the dropping-slide, as will be hereinafter more fully set forth.

In order to enable others skilled in the art to which my invention appertains to make and use the same, I will now proceed to describe its construction and operation, referring to the accompanying drawing, in which—

Figure 1 is a plan view, and Fig. 2 a side elevation, of my machine.

A represents a light frame resting on the ends of the axle B, on which are two wheels, C C, having sharp rims provided with projections $c$ to prevent the wheel from slipping or sliding in the ground. Two opposite spokes in each wheel C are at their outer extremities provided with small metal plates $d$, which serve as markers.

The forward ends of the sides of the frame A are hinged to the main frame D by means of circular metal boxes $a$, passing over the ends of the axle $f$ outside of the wheels E E. Attached to the axle $f$ inside the wheels E is the main frame D, whose front end rests on the runners or furrow-openers F. On top of the frame D, just forward of the wheels E, are set the seed-boxes G, between and through which extends the seed-slide H. On the ends of the seed-boxes are two plates, $g$ $g$, to which are pivoted the angle-levers I I, connected by cords $i$ $i$ to opposite ends of the slide H, and also by cords $e$ $e$ to the elbow-lever J, pivoted to the inside of the frame A just in front of the axle B.

On the ends of the axle B, between the frame A and wheels C C, are two arms, L L, extending in opposite directions, and, as the axle revolves, alternately striking the short ends of the elbow-levers J, and, by means of the cords $e$ $e$, levers I I, and cords $i$ $i$, imparting a reciprocating motion to the dropping-slide H. On the shaft or axle B is also a hand-wheel, $b$, by which the wheels may be so set at the end of a row or the entrance of the field that the markers will strike the ground at the proper time.

To the front axle, $f$, is fastened the driver's seat M, from which is suspended a hoop, N, by means of which the frame A is held up while passing from field to field.

In operation, the seed-boxes G are filled with seed, and, motion being imparted to the machine, the arms L L strike the levers J, and, by means of the connecting cords and levers above described, impart a reciprocating motion to the seed-slide H, and causing the seed to be distributed.

Having thus fully described my invention, what I claim as new, and desire to secure by Letters Patent, is—

1. The seed-slide H, cross-cords $i$ $i$, angle-levers I I, cords $e$ $e$, levers J J, and revolving arms L L, all arranged substantially as and for the purposes set forth.

2. The front frame, D, with runners F, seed-boxes G, and seed-slide or bar H, in combination with the rear hinged frame, A, wheels E, arms L, levers J, cords $e$ $e$, angle-levers I, and cross-cords $i$ $i$, all arranged substantially as and for the purposes set forth.

In testimony that I claim the foregoing as my own I affix my signature in presence of two witnesses.

WARREN W. S. KIME.

Witnesses:
O. K. BALES.
J. B. CARY.